United States Patent
Shi et al.

(10) Patent No.: US 10,212,632 B2
(45) Date of Patent: Feb. 19, 2019

(54) MOBILITY MANAGEMENT APPARATUS RESELECTION METHOD AND MOBILITY MANAGEMENT APPARATUS

(71) Applicant: HUAWEI TECHNOLOGIES CO., LTD., Shenzhen, Guangdong (CN)

(72) Inventors: Xiaoyan Shi, Shenzhen (CN); Wanqiang Zhang, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/963,530

(22) Filed: Apr. 26, 2018

(65) Prior Publication Data
US 2018/0249392 A1    Aug. 30, 2018

Related U.S. Application Data

(63) Continuation of application No. 15/381,760, filed on Dec. 16, 2016, now Pat. No. 10,004,016, which is a
(Continued)

(51) Int. Cl.
*H04W 36/00* (2009.01)
*H04W 8/02* (2009.01)
(Continued)

(52) U.S. Cl.
CPC ............ *H04W 36/12* (2013.01); *H04W 8/02* (2013.01); *H04W 8/12* (2013.01); *H04W 36/0033* (2013.01)

(58) Field of Classification Search
CPC ........ H04W 36/12; H04W 4/005; H04M 3/42
See application file for complete search history.

(56) References Cited

U.S. PATENT DOCUMENTS

| | | | | |
|---|---|---|---|---|
| 2009/0176496 A1* | 7/2009 | Li | ............... | H04L 47/767 455/437 |
| 2010/0255808 A1* | 10/2010 | Guo | ............... | H04W 4/90 455/404.1 |

(Continued)

FOREIGN PATENT DOCUMENTS

| | | |
|---|---|---|
| CN | 102170626 | 8/2011 |
| CN | 102892098 | 1/2013 |

(Continued)

OTHER PUBLICATIONS

*3rd Generation Partnership Project; Technical Specification Group Core Network and Terminals; Non-Access-Stratum (NAS) protocol for Evolved Packet System (EPS); Stage 3 (Release 12)*, 3GPP TS 24.301 V12.4.0 (Mar. 2014), pp. 1-362.

(Continued)

*Primary Examiner* — Dung Hong
(74) *Attorney, Agent, or Firm* — Staas & Halsey LLP

(57) ABSTRACT

A mobility management apparatus reselection method and a mobility management apparatus are provided. The method includes: receiving an access request message sent from user equipment (UE), where the access request message carries identity information of the UE; determining, according to the identity information of the UE, a type of a mobility management apparatus that the UE needs to access; reselecting a second mobility management apparatus according to the type of the mobility management apparatus that the UE needs to access; and forwarding the access request message to the second mobility management apparatus, so that the second mobility management apparatus executes an access request procedure of the UE. The embodiments of the present invention is applicable to the field of communications technologies.

3 Claims, 10 Drawing Sheets

Related U.S. Application Data continuation of application No. PCT/CN2014/080113, filed on Jun. 17, 2014.

(51) Int. Cl.
*H04W 36/12* (2009.01)
*H04W 8/12* (2009.01)

(56) References Cited

U.S. PATENT DOCUMENTS

| | | | |
|---|---|---|---|
| 2010/0291943 A1* | 11/2010 | Mihaly | H04L 29/12066 455/450 |
| 2012/0302230 A1* | 11/2012 | Lim | H04W 76/021 455/422.1 |
| 2013/0021970 A1 | 1/2013 | Lei | |
| 2013/0316706 A1 | 11/2013 | Knauft | |
| 2014/0171096 A1* | 6/2014 | Hwang | H04W 48/02 455/452.1 |
| 2014/0211728 A1* | 7/2014 | Zembutsu | H04W 76/10 370/329 |
| 2014/0313889 A1* | 10/2014 | Jeong | H04W 76/19 370/230 |
| 2015/0043534 A1* | 2/2015 | Shirota | H04W 84/042 370/331 |
| 2015/0296551 A1* | 10/2015 | Kim | H04W 76/14 455/426.1 |
| 2015/0312822 A1* | 10/2015 | Bangolae | H04W 36/08 370/311 |
| 2016/0128051 A1 | 5/2016 | Zembutsu et al. | |
| 2017/0041218 A1* | 2/2017 | Fan | H04W 40/02 |

FOREIGN PATENT DOCUMENTS

| | | |
|---|---|---|
| EP | 2763496 | 8/2014 |
| JP | 2013516857 | 5/2013 |
| JP | 5500320 B2 | 5/2014 |
| WO | WO2013047822 | 4/2013 |

OTHER PUBLICATIONS

*3rd Generation Partnership Project; Technical Specification Group Services and System Aspects; General Packet Radio Service (GPRS) enhancements for Evolved Universal Terrestrial Radio Access Network (E-UTRAN) access (Release 12)*, 3GPP TS 23.401 V12.4.0 (Mar. 2014), pp. 1-302.
International Search Report, dated Mar. 23, 2015, in International Application No. PCT/CN2014/080113 (9 pp.).
Extended European Search Report, dated May 8, 2017, in European Application No. 14895273.2 (8 pp.).
Notice of Reason(s) for Rejection, dated Feb. 13, 2018, in Japanese Application No. 2016-573880 (7 pp.).
Office Action, dated Sep. 6, 2017, in U.S. Appl. No. 15/381,760 (17 pp.).
Notice of Allowance, dated Jan. 26, 2018, in U.S. Appl. No. 15/381,760 (8 pp.).
U.S. Appl. No. 15/381,760, filed Dec. 16, 2016, Xiaoyan Shi et al., Huawei Technologies Co., Ltd.
Notice of Allowance, dated Jul. 12, 2018, in Korean Application No. 1020177000959 (3 pp.).
Yuchangmo, "LTE Network structure (Network Reference Model)," Netmanias Tech-Blog, dated Dec. 2, 2011 (5 pp.).
Notice to Submit a Response, dated Oct. 18, 2018, in Korean Application No. 1020187022281 (7 pp.).

\* cited by examiner

MOBILITY MANAGEMENT APPARATUS RESELECTION METHOD AND MOBILITY MANAGEMENT APPARATUS

CROSS-REFERENCE TO RELATED APPLICATIONS

This application is a continuation of U.S. patent application Ser. No. 15/381,760, filed on Dec. 16, 2016, which is a continuation of International Patent Application No. PCT/CN2014/080113 filed on Jun. 17, 2014. All of the aforementioned patent applications are hereby incorporated by reference in their entireties.

TECHNICAL FIELD

Embodiments of the present invention relate to the field of communications technologies, and in particular, to a mobility management apparatus reselection method and mobility management apparatus.

BACKGROUND

For authorized user equipment (UE for short) that has signed a network access protocol with an operator, to normally use a subscribed service over a network, each time the UE is powered on, the UE needs to complete, on the network of the operator, a procedure of registering with and attaching to the network; or after a preset time since the UE completely leaves coverage of the network, the UE needs to complete again, on the network of the operator, a procedure of registering with and attaching to the network; or when entering from an area of the network of the operator to another area, the UE needs to perform a routing area update procedure.

Currently, because on-net UEs subscribe to different services and have different charging standards, an operator expects to classify mobility management entities (MME for short), and different MMEs process access requests of UEs that subscribe to different services. In this way, users subscribing to different services are logically managed separately, which can improve management efficiency of a communications operator. For example, for all user equipments that subscribe to an M2M service, a group of dedicated MMEs are used for management; for all user equipments that do not subscribe to an M2M service, another group of MMEs are used for management.

However, in a Long Term Evolution (LTE for short) network, when UE executes an attach procedure or a routing area update procedure, an evolved node eNodeB selects an MME for the UE by depending on only a network topology. In this way, it is possible that the eNodeB selects a wrong MME for the UE. Therefore, in a case in which MMEs are classified into multiple classes and provide services to UEs subscribing to services of different types, how to select an MME is a problem that urgently needs to be resolved.

SUMMARY

Embodiments of the present invention provide an MME reselection method and an MME, so that UE can use a correct MME in time to execute an access request procedure.

To achieve the foregoing objective, the following technical solutions are used in the embodiments of the present invention:

According to a first aspect, a first mobility management entity MME is provided, where the first MME includes:

a receiving unit, configured to receive an access request message sent by user equipment UE, where the access request message carries identity information of the UE;

a determining unit, configured to determine, according to the identity information of the UE, a type of an MME that the UE needs to access;

a reselection unit, configured to reselect a second MME according to the type of the MME that the UE needs to access; and a sending unit, configured to forward the access request message to the second MME, so that the second MME executes an access request procedure of the UE.

With reference to the first aspect, in a first possible implementation manner, the receiving unit is further configured to receive an interaction message that is generated between the UE and the second MME during execution of the access request procedure; and the sending unit is further configured to forward the interaction message that is generated between the UE and the second MME during execution of the access request procedure.

With reference to the first aspect or the first possible implementation manner of the first aspect, in a second possible implementation manner, the determining unit is specifically configured to:

determine, according to the identity information of the UE and preconfiguration indication information, the type of the MME that the UE needs to access, where the preconfiguration indication information includes information about a correspondence between the identity information of the UE and the type of the MME that the UE needs to access.

With reference to the first aspect or the first possible implementation manner of the first aspect, in a third possible implementation manner, the determining unit is specifically configured to:

obtain subscription data of the UE from a home subscriber server HSS according to the identity information of the UE, where the subscription data includes information about the type of the MME that the UE needs to access; and determine, according to the subscription data, the type of the MME that the UE needs to access.

With reference to the first aspect or the first possible implementation manner of the first aspect, in a fourth possible implementation manner, the determining unit is specifically configured to:

obtain, according to the identity information of the UE, mobility management context information of the UE from an original MME accessed by the UE, where the mobility management context information includes information about the type of the MME that the UE needs to access; and determine, according to the mobility management context information, the type of the MME that the UE needs to access.

According to the fourth possible implementation manner of the first aspect, in a fifth possible implementation manner, the sending unit is specifically configured to forward the access request message and the mobility management context information of the UE to the second MME, so that the second MME executes the access request procedure of the UE according to the access request message and the mobility management context information of the UE.

According to a second aspect, a second mobility management entity MME is provided, where the second MME includes:

a receiving unit, configured to receive an access request message that is sent by user equipment UE and that is forwarded by a first MME, where the access request message includes an identity of the UE; and a processing unit, configured to execute an access request procedure of the UE according to the access request message.

With reference to the second aspect, in a first possible implementation manner, the second MME further includes:

a sending unit, configured to send an interaction message to the UE by using the first MME when the processing unit executes the access request procedure of the UE according to the access request message, where the receiving unit is specifically configured to: when the processing unit executes the access request procedure of the UE according to the access request message, receive, by using the first MME, an interaction message sent by the UE.

With reference to the second aspect or the first possible implementation manner of the second aspect, in a second possible implementation manner, the receiving unit is further configured to receive mobility management context information of the UE forwarded by the first MME; and the processing unit is specifically configured to execute the access request procedure of the UE according to the access request message and the mobility management context information of the UE.

With reference to the second aspect or the first possible implementation manner of the second aspect, in a third possible implementation manner, the sending unit is further configured to send a mobility management context request message to an original MME of the UE according to the identity of the UE carried in the access request message;

the receiving unit is further configured to receive a mobility management context response message sent by the original MME of the UE, where the mobility management context response message carries mobility management context information of the UE; and the processing unit is specifically configured to execute the access request procedure of the UE according to the access request message and the mobility management context information of the UE.

According to a third aspect, a first mobility management entity MME is provided, where the first MME includes:

a receiver, configured to receive an access request message sent by user equipment UE, where the access request message carries identity information of the UE;

a processor, configured to: determine, according to the identity information of the UE, a type of an MME that the UE needs to access; and reselect a second MME according to the type of the MME that the UE needs to access; and a transmitter, configured to forward the access request message to the second MME, so that the second MME executes an access request procedure of the UE.

With reference to the third aspect, in a first possible implementation manner, the receiver is further configured to receive an interaction message that is generated between the UE and the second MME during execution of the access request procedure; and the transmitter is further configured to forward the interaction message that is generated between the UE and the second MME during execution of the access request procedure.

With reference to the third aspect or the first possible implementation manner of the third aspect, in a second possible implementation manner, the processor is specifically configured to:

determine, according to the identity information of the UE and preconfiguration indication information, the type of the MME that the UE needs to access, where the preconfiguration indication information includes information about a correspondence between the identity information of the UE and the type of the MME that the UE needs to access.

With reference to the third aspect or the first possible implementation manner of the third aspect, in a third possible implementation manner, the processor is specifically configured to:

obtain subscription data of the UE from a home subscriber server HSS according to the identity information of the UE, where the subscription data includes information about the type of the MME that the UE needs to access; and determine, according to the subscription data, the type of the MME that the UE needs to access.

With reference to the third aspect or the first possible implementation manner of the third aspect, in a fourth possible implementation manner, the processor is specifically configured to:

obtain, according to the identity information of the UE, mobility management context information of the UE from an original MME accessed by the UE, where the mobility management context information includes information about the type of the MME that the UE needs to access; and determine, according to the mobility management context information, the type of the MME that the UE needs to access.

According to the fourth possible implementation manner of the third aspect, in a fifth possible implementation manner, the transmitter is specifically configured to forward the access request message and the mobility management context information of the UE to the second MME, so that the second MME executes the access request procedure of the UE according to the access request message and the mobility management context information of the UE.

According to a fourth aspect, a second mobility management entity MME is provided, where the second MME includes:

a receiver, configured to receive an access request message that is sent by user equipment UE and that is forwarded by a first MME, where the access request message includes an identity of the UE; and a processor, configured to execute an access request procedure of the UE according to the access request message.

With reference to the fourth aspect, in a first possible implementation manner, the second MME further includes:

a transmitter, configured to send an interaction message to the UE by using the first MME when the processor executes the access request procedure of the UE according to the access request message, where the receiver is specifically configured to: when the processor executes the access request procedure of the UE according to the access request message, receive, by using the first MME, an interaction message sent by the UE.

With reference to the fourth aspect or the first possible implementation manner of the fourth aspect, in a second possible implementation manner, the receiver is further configured to receive mobility management context information of the UE forwarded by the first MME; and the processor is specifically configured to execute the access request procedure of the UE according to the access request message and the mobility management context information of the UE.

With reference to the fourth aspect or the first possible implementation manner of the fourth aspect, in a third possible implementation manner, the transmitter is further configured to send a mobility management context request message to an original MME of the UE according to the identity of the UE carried in the access request message;

the receiver is further configured to receive a mobility management context response message sent by the original MME of the UE, where the mobility management context response message carries mobility management context information of the UE; and the processor is specifically configured to execute the access request procedure of the UE according to the access request message and the mobility management context information of the UE.

According to a fifth aspect, a mobility management entity MME reselection method is provided, where the method includes:

receiving an access request message sent by user equipment UE, where the access request message carries identity information of the UE;

determining, according to the identity information of the UE, a type of an MME that the UE needs to access;

reselecting a second MME according to the type of the MME that the UE needs to access; and forwarding the access request message to the second MME, so that the second MME executes an access request procedure of the UE.

With reference to the fifth aspect, in a first possible implementation manner, after the forwarding the access request message to the second MME, so that the second MME executes an access request procedure of the UE, the method further includes:

receiving an interaction message that is generated between the UE and the second MME during execution of the access request procedure; and forwarding the interaction message that is generated between the UE and the second MME during execution of the access request procedure.

With reference to the fifth aspect or the first possible implementation manner of the fifth aspect, in a second possible implementation manner, the determining, according to the identity information of the UE, a type of an MME that the UE needs to access specifically includes:

determining, according to the identity information of the UE and preconfiguration indication information, the type of the MME that the UE needs to access, where the preconfiguration indication information includes information about a correspondence between the identity information of the UE and the type of the MME that the UE needs to access.

With reference to the fifth aspect or the first possible implementation manner of the fifth aspect, in a third possible implementation manner, the determining, according to the identity information of the UE, a type of an MME that the UE needs to access specifically includes:

obtaining subscription data of the UE from a home subscriber server HSS according to the identity information of the UE, where the subscription data includes information about the type of the MME that the UE needs to access; and determining, according to the subscription data, the type of the MME that the UE needs to access.

With reference to the fifth aspect or the first possible implementation manner of the fifth aspect, in a fourth possible implementation manner, the determining, according to the identity information of the UE, a type of an MME that the UE needs to access specifically includes:

obtaining, according to the identity information of the UE, mobility management context information of the UE from an original MME accessed by the UE, where the mobility management context information includes information about the type of the MME that the UE needs to access; and determining, according to the mobility management context information, the type of the MME that the UE needs to access.

According to the fourth possible implementation manner of the fifth aspect, in a fifth possible implementation manner, after the forwarding the access request message to the second MME, the method further includes:

forwarding the mobility management context information of the UE to the second MME.

According to a sixth aspect, a mobility management entity MME reselection method is provided, where the method includes:

receiving an access request message that is sent by user equipment UE and that is forwarded by a first MME, where the access request message includes an identity of the UE; and executing an access request procedure of the UE according to the access request message.

With reference to the sixth aspect, in a first possible implementation manner, the executing an access request procedure of the UE according to the access request message specifically includes:

sending an interaction message to the UE by using the first MME, and receiving, by using the first MME, an interaction message sent by the UE.

With reference to the sixth aspect or the first possible implementation manner of the sixth aspect, in a second possible implementation manner, before the executing an access request procedure of the UE according to the access request message, the method further includes:

receiving mobility management context information of the UE forwarded by the first MME; and the executing an access request procedure of the UE according to the access request message specifically includes:

executing the access request procedure of the UE according to the access request message and the mobility management context information of the UE.

With reference to the sixth aspect or the first possible implementation manner of the sixth aspect, in a third possible implementation manner, after the receiving an access request message that is sent by user equipment UE and that is forwarded by a first MME, the method further includes:

sending a mobility management context request message to an original MME of the UE according to the identity of the UE carried in the access request message;

receiving a mobility management context response message sent by the original MME of the UE, where the mobility management context response message carries mobility management context information of the UE; and the executing an access request procedure of the UE according to the access request message specifically includes:

executing the access request procedure of the UE according to the access request message and the mobility management context information of the UE.

By means of the MME reselection method and the MME that are provided in the embodiments of the present invention, based on the foregoing technical solutions, a first MME may reselect, for UE, an MME that the UE needs to access, that is, a second MME, and forward an access request message of the UE to the second MME, and the second MME may execute an access request procedure of the UE according to the access request message of the UE forwarded by the first MME, so that the UE can use a correct MME in time to execute the access request procedure.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In addition, to briefly describe the following embodiments, several related definitions are provided below, and details are as follows:

A first MME: an MME selected by an eNodeB for UE according to a network topology.

A second MME: an MME that is determined by a first MME according to identity information of the UE and that the UE needs to access, where the MME that the UE needs to access is referred to as a second MME.

An original MME: an MME that executes an attach procedure of UE or an MME that executes a previous routing area update procedure before the UE initiates a current routing area update request.

Specifically, before the current routing area update request is initiated, if a previously completed access request initiated by the UE is an attach request, the original MME herein refers to an MME that executes an attach procedure of the UE; before the current routing area update request is initiated, if a previously completed access request initiated by the UE is a routing area update request, the original MME herein refers to an MME that executes a previous routing area update procedure.

It should be noted that the foregoing definitions are applicable to the following embodiments, and are described herein together; details are not described below again.

LTE is informally referred to as 3.9G, has a 100 Mbps data downloading capability, and is considered as a mainstream technology evolving from 3G to 4G. An evolved packet core (EPC for short) is a set of solutions that helps operators to provide advanced mobile broadband services by using an LTE technology. A core network in LTE evolves to the EPC, and a combination of the EPC and an evolved universal terrestrial radio access network (EUTRAN for short) is referred to as an evolved packet system (EPS for short).

Figure 1:
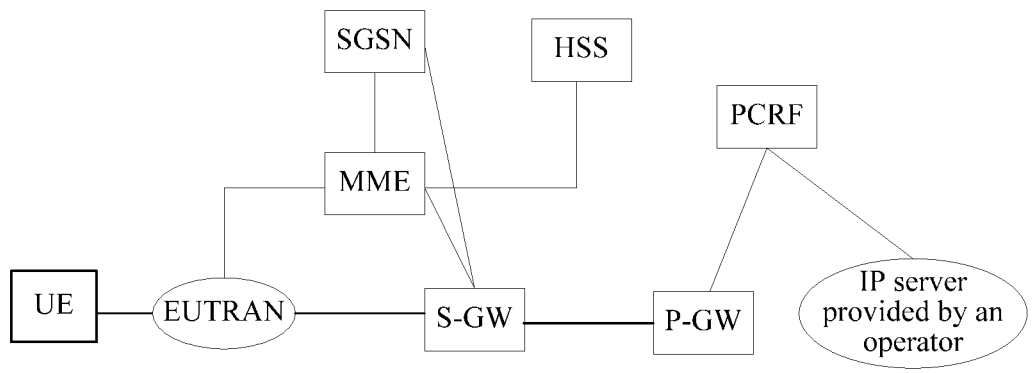
FIG. 1 is an architectural diagram of a wireless network of an evolved packet system EPS in LTE.

A wireless network architecture of the EPS is shown in FIG. 1, and includes network entities, such as UE, an EUTRAN, an MME, a serving gateway (S-GW for short), a packet data network gateway (P-GW for short), an HSS, a serving general packet radio service support node (SGSN for short), a policy and charging rules function (PCRF for short) unit, and a server by using which an operator can provide an IP service.

Specifically, functions of main network entities are as follows:

The EUTRAN is a network including multiple eNodeBs, and implements a wireless physical layer function, resource scheduling and radio resource management, radio access control, and a mobility management function.

The eNodeB is connected to an S-GW by using a user plane interface S1-U, and is configured to transport user data; and is connected to an MME by using a control plane interface S1-MME, and implement, by using an S1-AP protocol, functions of controlling a radio access bearer and the like.

The MME is responsible for all control plane functions in user session management, including NAS signaling and security setting, tracking area list management, selection of a P-GW and an S-GW, and the like.

The S-GW is responsible for transmitting and forwarding data of UE and routing switching, and is used as a local mobility anchoring point when the UE performs switching between eNodeBs (for each UE, only one S-GW serves the UE at each moment).

The P-GW is used as an anchoring point of a PDN connection, and is responsible for allocating an IP address of UE, filtering data packets of UE, rate control, generating charging information, and the like.

Specifically, UE accesses an EPS network and establishes a packet data network (PDN) connection by using an attach procedure or a routing area update procedure. In this process, the P-GW allocates an IP address to the user equipment, and the UE implements data transmission with an external network by using the IP address.

First, for ease of understanding the present invention, an attach procedure and a routing area update procedure of UE in the prior art are briefly described below.

Figure 2:
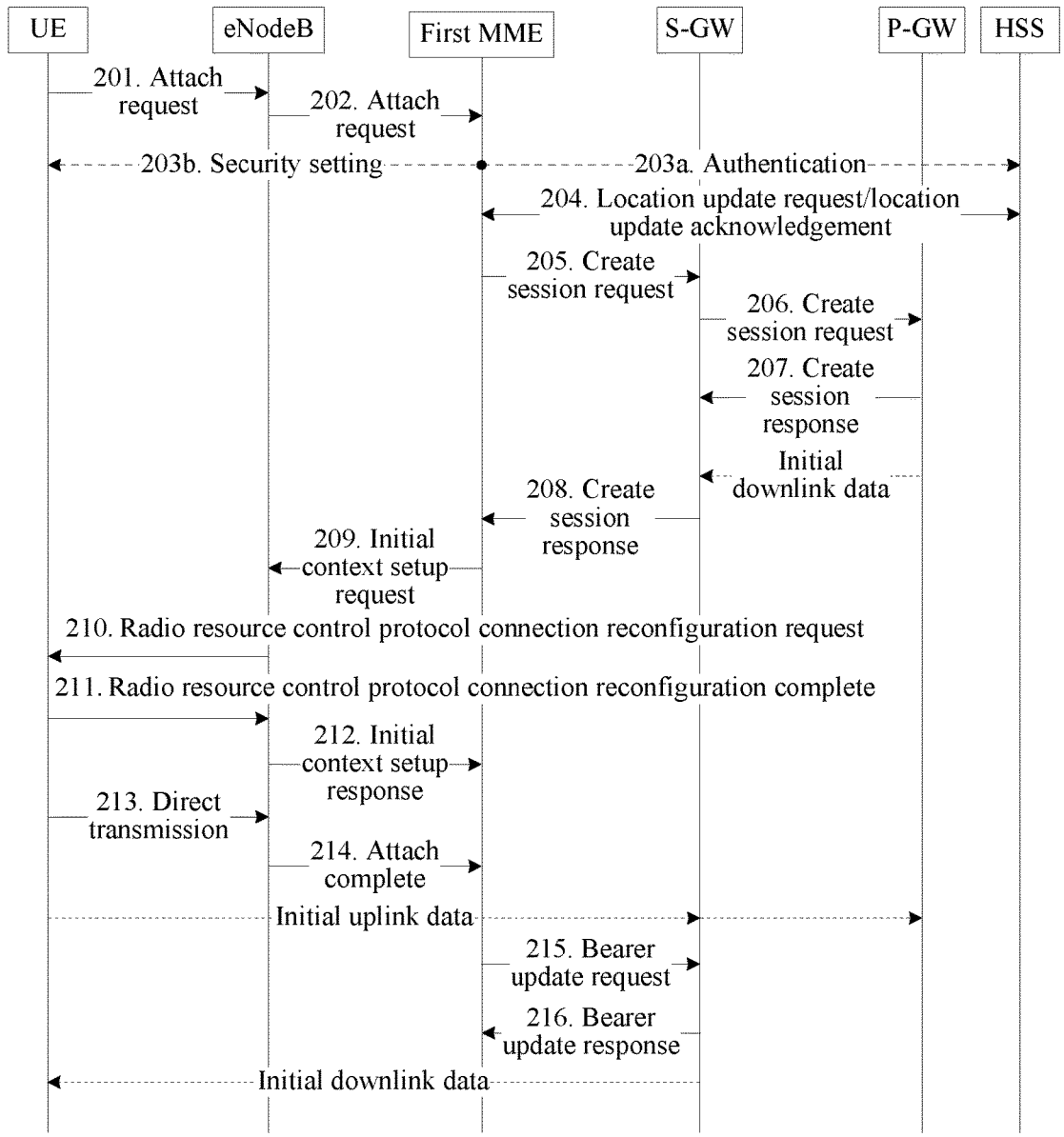
FIG. 2 is an schematic interaction diagram of an attach procedure in LTE.

Specifically, an implementation process of the attach procedure of the UE is shown in FIG. 2, and details are as follows:

201: UE sends an attach request message to an eNodeB.

The attach request message includes information such as an IMSI, a core network capability of the UE, a discontinuous reception parameter specified by the UE, an encryption option transmission mark, an attach type, a NAS sequence number, and NAS-media access control.

202: The eNodeB forwards, to a first MME, the attach request message sent by the UE.

The attach request message further includes user location information.

203a: The first MME and an HSS authenticate the UE.

203b: The first MME and the UE perform security setting on a non-access stratum (NAS for short) message.

Specifically, the first MME and the UE perform security setting, such as integrity protection, an encryption manner, or key information, on the NAS message.

204: The first MME exchanges a location update request message and a location update request acknowledgement message with the HSS.

Specifically, the first MME sends the location update request message to the HSS. The HSS updates stored information about a location of an MME on which the UE is located, and after the update is completed, returns the location update request acknowledgement message to the first MME, and returns subscription information of the UE to the first MME.

205: The first MME sends a create session request message to an S-GW.

Specifically, the first MME selects an S-GW and a P-GW for the UE according to the subscription information of the UE, and sends the create session request message to the selected S-GW.

The create session request message includes an IMSI of the UE, an address of a P-GW needing to be accessed, a type of an access technology, user location information, an identifier of an EPS bearer, and the like.

206: The S-GW is connected to a P-GW and sends the create session request message to the P-GW.

Specifically, the S-GW creates default bearer context information, and connects to and sends the create session request message to the P-GW according to the address, which is included in the session request message, of the P-GW needing to the accessed.

The default bearer context information includes allocation of a user plane tunnel endpoint identifier (TEID for short) to a default bearer, and the like.

The create session message includes the IMSI, a user plane address of the S-GW, a user plane TEID of the S-GW, the type of the access technology, the user location information, the identifier of the EPS bearer, and the like.

207: The P-GW returns a create session response message to the S-GW.

Specifically, the P-GW creates default bearer context information, generates a charging identifier of a default bearer, and returns the create session response message to the S-GW.

The default bearer context information includes allocation of a user plane TEID to the default bearer.

The create session response message includes information such as a user plane address of the P-GW, a user plane TEID of the P-GW, the identifier of the EPS bearer, and an IP address allocated to the UE. Since this step, the P-GW starts to forward initial downlink data. Since this step, the S-GW starts to buffer downlink data received from the P-GW.

208: The S-GW returns the create session response message to the first MME.

The create session response message includes the IP address allocated to the UE, the user plane address of the S-GW, the user plane TEID of the S-GW, quality of service (QoS for short) of the EPS bearer, the identifier of the EPS bearer, and the like.

209: The first MME sends an initial context setup request message the eNodeB.

The initial context setup request message includes information such as the QoS of the EPS bearer, the identifier of the EPS bearer, the user plane address of the S-GW, and the user plane TEID of the S-GW. The initial context setup request message further includes content of an attach accept message that is sent by the first MME to the UE by using the eNodeB, and the content of the attach accept message includes information such as the IP address allocated to the UE, the identifier of the EPS bearer, and the QoS of the EPS bearer.

210: The eNodeB sends a radio resource control protocol connection reconfiguration message to the UE.

The radio resource control protocol connection reconfiguration message further includes the content of the attach accept message that is sent by the first MME to the UE by using the eNodeB, and the content of the attach accept message includes information such as the IP address allocated to the UE, the identifier of the EPS bearer, and the QoS of the EPS bearer.

211: The UE sends a radio resource control protocol connection reconfiguration complete message to the eNodeB.

212: The eNodeB sends an initial context setup response message the first MME.

The initial context setup response message includes a TEID allocated by the eNodeB to a user plane, a user plane address of the eNodeB, and the like.

213: The UE sends a direct transmission message to the eNodeB.

The direct transmission message includes content of an attach complete message that is sent by the UE to the first MME by using the eNodeB.

214: The eNodeB forwards an attach complete message to the first MME.

215: The first MME sends a bearer update request message to the S-GW.

Specifically, after the first MME receives the initial context setup response message and the attach complete message, the first MME sends the bearer update request message to the S-GW.

The bearer update request message includes the TEID allocated by the eNodeB to the user plane and the user plane address of the eNodeB.

216: The S-GW sends a bearer update response message to the first MME, and starts to send, to the eNodeB, a downlink data packet that is buffered starting from step 207.

Figure 3:
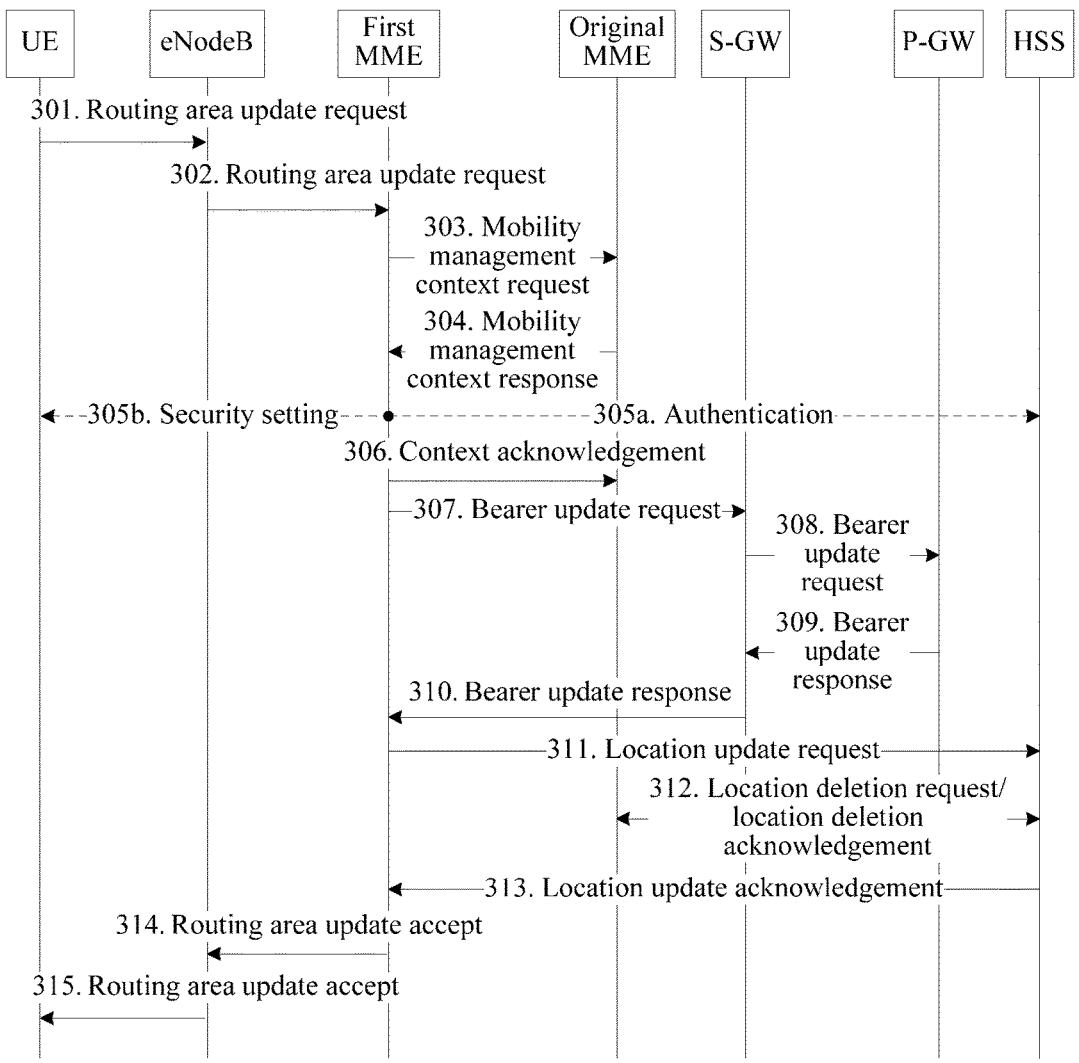
FIG. 3 is an schematic interaction diagram of a routing area update procedure in LTE.

An implementation process of the routing area update procedure of the UE is shown in FIG. 3, and details are as follows:

301: UE sends a routing area update request message to an eNodeB.

The routing area update request message includes a globally unique temporary identity (GUTI for short) of the UE, where the identity is allocated by an original MME, the GUTI includes a globally unique MME identifier (GUMMEI for short), and the GUMMEI is allocated, to the UE, by an MME that executes an attach procedure of the UE or an MME that executes a previous routing area update procedure.

302: The eNodeB forwards the routing area update request message to a first MME.

Specifically, the eNodeB selects one MME, that is, the first MME, for the UE according to a network topology, and forwards a routing area update request of the UE to the first MME.

303: The first MME sends a mobility management context request message to an original MME.

Specifically, the first MME learns, according to information about the GUMMEI included in the GUTI, an address of the original MME at which a mobility management context of the UE is located, and sends the mobility management context request message to the original MME.

The mobility management context request message includes the GUTI of the UE.

304: The original MME returns a mobility management context response message to the first MME.

Specifically, the original MME determines a mobility management context of the UE according to the GUTI of the UE, and returns the mobility management context, which is included in the mobility management context response message, of the UE to the first MME.

305a: The first MME and an HSS authenticate the UE.

305b: The first MME and the UE perform security setting on a NAS message.

Specifically, the first MME and the UE perform security setting, such as integrity protection, an encryption manner, or key information, on the NAS message.

It should be noted that whether this step exists depends on 304.

If a mobility management context that is returned by the original MME to the first MME in 304 includes a security context of the original MME and the UE, this step is omitted, and the first MME and the UE do not need to perform security setting on the NAS message.

If a mobility management context that is returned by the original MME to the first MME in 304 does not include a security context of the original MME and the UE, the first MME and the UE need to perform security setting on the NAS message in this step.

306: The first MME sends a context acknowledgement message to the original MME.

The context message includes an S-GW change indication that indicates whether the S-GW changes in the routing area update procedure, so that the original MME decides whether to delete a stored user context of an original S-GW, where the original S-GW is an S-GW that is selected by the original MME for the UE.

307: The first MME initiates a bearer update request message to the S-GW.

Specifically, the first MME initiates the bearer update request message to the S-GW, and provides location information and the like of the current UE.

308: The S-GW sends a bearer update request message to a P-GW.

309: The P-GW returns a bearer update response message to the S-GW.

310: The S-GW sends the bearer update response message to the first MME.

311: The first MME sends a location update request message to the HSS.

Specifically, the first MME sends the location update request message to the HSS, and the HSS updates stored location information of the UE, where the HSS updates information about a location at which the UE is served by the original MME to information about a location at which the UE is served by the first MME.

312: The HSS exchanges a location deletion request message and a location deletion request acknowledgement message with the original MME.

Specifically, the HSS sends the location deletion request message to the original MME, and the original MME removes a user mobility management context, and returns the location deletion acknowledgement message to the HSS.

313: The HSS returns a location update request acknowledgement message to the first MME.

Specifically, after updating information about a location of the first MME on which the UE is located, the HSS returns the location update request acknowledgement message to the first MME, and sends user subscription data to the first MME.

314: The first MME sends a routing area update accept message to the eNodeB.

The routing area update accept message includes a GUTI that is reallocated by the first MME to the UE.

315: The eNodeB forwards the routing area update accept message to the UE.

In specific implementation processes of the foregoing procedures, when UE executes an attach procedure or a routing area update procedure, an eNodeB selects an MME for the UE depending on only a network topology; therefore, it is possible that the eNodeB selects a wrong MME for the UE.

Figure 4:
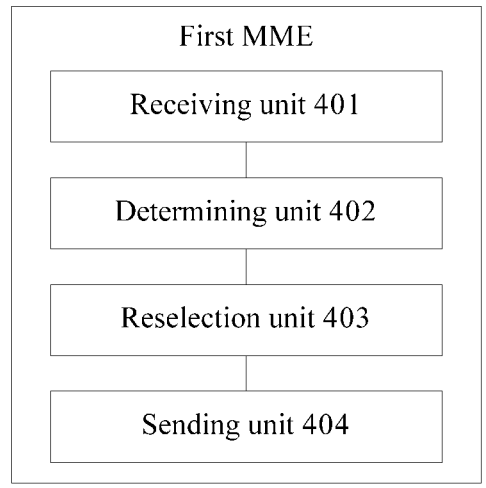
FIG. 4 is a schematic structural composition diagram of a first MME according to an embodiment of the present invention.

In view of this, an embodiment of the present invention provides a first MME. As shown in FIG. 4, the MME includes: a receiving unit 401, a determining unit 402, a reselection unit 403, and a sending unit 404.

The receiving unit 401 is configured to receive an access request message sent by user equipment UE, where the access request message carries identity information of the UE.

The determining unit 402 is configured to determine, according to the identity information of the UE, a type of an MME that the UE needs to access.

The reselection unit 403 is configured to reselect a second MME according to the type of the MME that the UE needs to access.

The sending unit 404 is configured to forward the access request message to the second MME, so that the second MME executes an access request procedure of the UE.

Optionally, the receiving unit 401 is further configured to receive an interaction message that is generated between the UE and the second MME during execution of the access request procedure; and optionally, the sending unit 402 is further configured to forward the interaction message that is generated between the UE and the second MME during execution of the access request procedure.

The determining unit 402 is specifically configured to: determine, according to the identity information of the UE and preconfiguration indication information, the type of the MME that the UE needs to access, where the preconfiguration indication information includes information about a correspondence between the identity information of the UE and the type of the MME that the UE needs to access.

Optionally, the determining unit 402 is further specifically configured to: obtain subscription data of the UE from a home subscriber server HSS according to the identity information of the UE, where the subscription data includes information about the type of the MME that the UE needs to access; and determine, according to the subscription data, the type of the MME that the UE needs to access.

Optionally, the determining unit 402 is further specifically configured to: obtain, according to the identity information of the UE, mobility management context information of the UE from an original MME accessed by the UE, where the mobility management context information includes information about the type of the MME that the UE needs to access; and determine, according to the mobility management context information, the type of the MME that the UE needs to access.

Optionally, the sending unit 404 is specifically configured to forward the access request message and the mobility management context information of the UE to the second MME, so that the second MME executes the access request procedure of the UE according to the access request message and the mobility management context information of the UE.

This embodiment of the present invention provides a first MME. Based on the foregoing technical solution, the first MME may reselect, for UE, an MME that the UE needs to access, that is, a second MME, and forward an access request message of the UE to the second MME, so that the UE can use a correct MME in time to execute an access request procedure.

Figure 5:
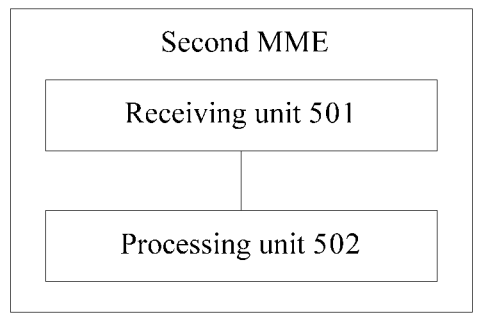
FIG. 5 is a schematic structural composition diagram of a second MME according to an embodiment of the present invention.

Based on the first MME provided in the foregoing embodiment, an embodiment of the present invention further provides a second MME. As shown in FIG. 5, the MME includes: a receiving unit 501 and a processing unit 502.

The receiving unit 501 is configured to receive an access request message that is sent by user equipment UE and that is forwarded by the first MME, where the access request message includes an identity of the UE; and the processing unit 502 is configured to execute an access request procedure of the UE according to the access request message.

Figure 5A:
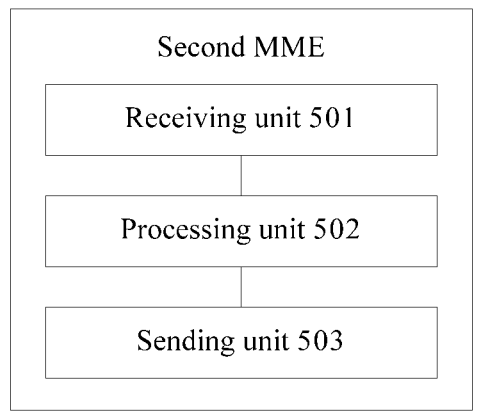
FIG. 5a is a schematic structural composition diagram of another second MME according to an embodiment of the present invention.

Optionally, as shown in FIG. 5a, the second MME further includes:

a sending unit 503, configured to send an interaction message to the UE by using the first MME when the processing unit 502 executes the access request procedure of the UE according to the access request message, where the receiving unit 501 is specifically configured to: when the processing unit 502 executes the access request procedure of the UE according to the access request message, receive, by using the first MME, an interaction message sent by the UE.

Optionally, the receiving unit 501 is further configured to receive mobility management context information of the UE forwarded by the first MME; and the processing unit 502 is specifically configured to execute the access request procedure of the UE according to the access request message and the mobility management context information of the UE.

Optionally, the sending unit 503 is further configured to send a mobility management context request message to an original MME of the UE according to the identity of the UE carried in the access request message;

the receiving unit 501 is further configured to receive a mobility management context response message sent by the original MME of the UE, where the mobility management context response message carries mobility management context information of the UE; and the processing unit 502 is specifically configured to execute the access request procedure of the UE according to the access request message and the mobility management context information of the UE.

This embodiment of the present invention provides a second MME. Based on the foregoing technical solution, the second MME may execute an access request procedure of UE according to an access request message of the UE forwarded by a first MME, so that the UE can use a correct MME in time to execute the access request procedure.

Figure 6:
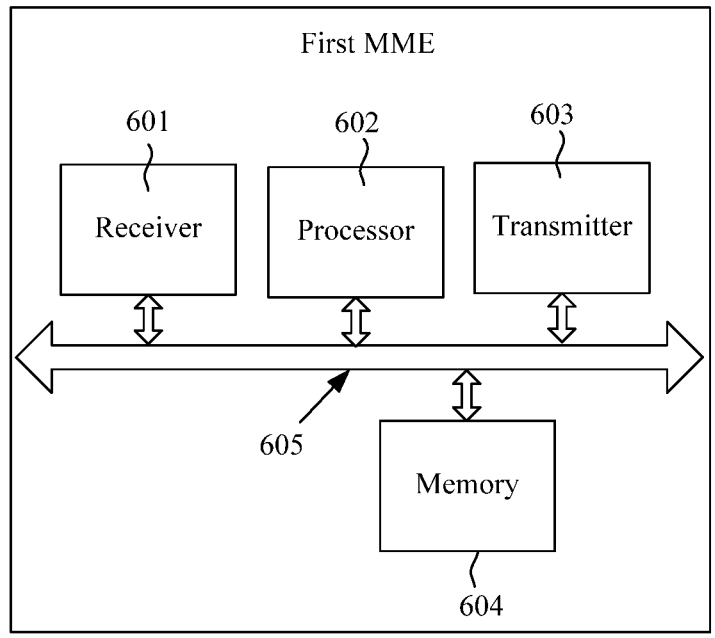
FIG. 6 is a schematic structural composition diagram of a first MME according to an embodiment of the present invention.

Based on the first MME provided in the foregoing embodiment, an embodiment of the present invention further provides a first MME. As shown in FIG. 6, the first MME includes: a receiver 601, a processor 602, a transmitter 603, a memory 604, and a first communications bus 605 that is configured to implement a connection and communication between these apparatuses.

The processor 602 may be a central processing unit (CPU for short) or an application-specific integrated circuit (ASIC for short), or is configured as one or more integrated circuits that implement this embodiment of the present invention.

The processor 602 is configured to execute executable program code, for example, a computer program, stored in the memory 604, to run a program corresponding to the executable code.

The memory 604 is configured to store the executable program code, where the program code includes a computer operation instruction. The memory 604 may include a high-speed RAM memory, and may further include a non-volatile memory, such as at least one magnetic disk storage.

The first communications bus 605 may be an Industry Standard Architecture (ISA for short) bus, a peripheral component interconnect (PCI for short) bus, an Extended Industry Standard Architecture (EISA for short) bus, or the like. The bus 605 may be classified into an address bus, a data bus, a control bus, and the like. For ease of representation, the bus in FIG. 6 is represented by using only one bold line, but it does not indicate that there is only one bus or only one type of bus.

Specifically, the receiver 601 is configured to receive an access request message sent by user equipment UE, where the access request message carries identity information of the UE;

the processor 602 is configured to: determine, according to the identity information of the UE, a type of an MME that the UE needs to access; and reselect a second MME according to the type of the MME that the UE needs to access; and the transmitter 603 is configured to forward the access request message to the second MME, so that the second MME executes an access request procedure of the UE.

Optionally, the receiver 601 is further configured to receive an interaction message that is generated between the UE and the second MME during execution of the access request procedure; and the transmitter 603 is further configured to forward the interaction message that is generated between the UE and the second MME during execution of the access request procedure.

The processor 602 is specifically configured to determine, according to the identity information of the UE and preconfiguration indication information, the type of the MME that the UE needs to access, where the preconfiguration indication information includes information about a correspondence between the identity information of the UE and the type of the MME that the UE needs to access.

Optionally, the processor 602 is further specifically configured to: obtain subscription data of the UE from a home subscriber server HSS according to the identity information of the UE, where the subscription data includes information about the type of the MME that the UE needs to access; and determine, according to the subscription data, the type of the MME that the UE needs to access.

Optionally, the processor 602 is further specifically configured to: obtain, according to the identity information of the UE, mobility management context information of the UE from an original MME accessed by the UE, where the mobility management context information includes information about the type of the MME that the UE needs to access; and determine, according to the mobility management context information, the type of the MME that the UE needs to access.

Optionally, the transmitter 603 is specifically configured to forward the access request message and the mobility management context information of the UE to the second MME, so that the second MME executes the access request procedure of the UE according to the access request message and the mobility management context information of the UE.

This embodiment of the present invention provides a first MME. Based on the foregoing technical solution, the first MME may reselect, for UE, an MME that the UE needs to access, that is, a second MME, and forward an access request message of the UE to the second MME, so that the UE can use a correct MME in time to execute an access request procedure.

Figure 7:
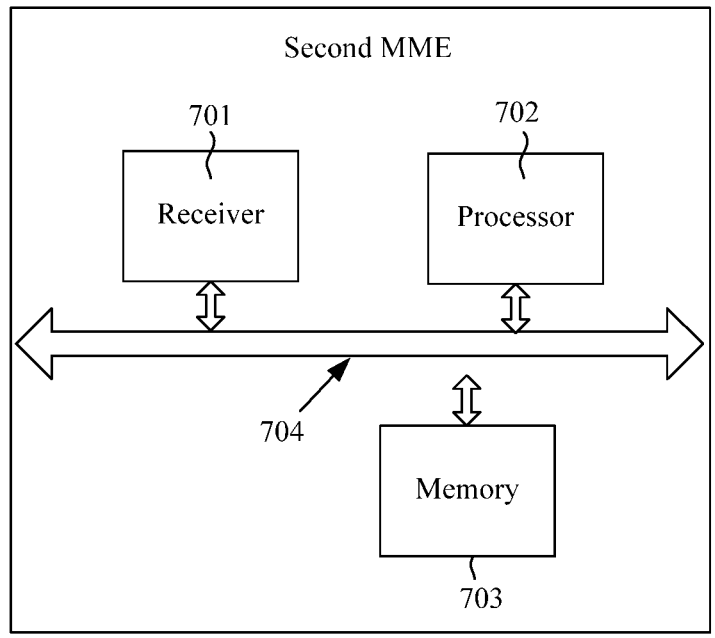
FIG. 7 is a schematic structural composition diagram of a second MME according to an embodiment of the present invention.

Based on the second MME provided in the foregoing embodiment, an embodiment of the present invention further provides a second MME. As shown in FIG. 7, the second MME includes: a receiver 701, a processor 702, a memory 703, and a first communications bus 704 that is configured to implement a connection and communication between these apparatuses.

The processor 702 may be a central processing unit (CPU for short) or an application-specific integrated circuit (ASIC for short), or is configured as one or more integrated circuits that implement the embodiment of the present invention.

The processor 702 is configured to execute executable program code, for example, a computer program, stored in the memory 703, to run a program corresponding to the executable code.

The memory 703 is configured to store executable program code, where the program code includes a computer operation instruction. The memory 703 may include a high-speed RAM memory, and may further include a non-volatile memory, such as at least one magnetic disk memory.

The first communications bus 704 may be an Industry Standard Architecture (ISA for short) bus, a peripheral component interconnect (PCI for short) bus, an Extended Industry Standard Architecture (EISA for short) bus, or the like. The bus 704 may be classified into an address bus, a data bus, a control bus, and the like. For ease of representation, the bus in FIG. 7 is represented by using only one bold line, but it does not indicate that there is only one bus or only one type of bus.

Specifically, the receiver 701 is configured to receive an access request message that is sent by user equipment UE and that is forwarded by first MME, where the access request message includes an identity of the UE; and the processor 702 is configured to execute an access request procedure of the UE according to the access request message.

Figure 7A:
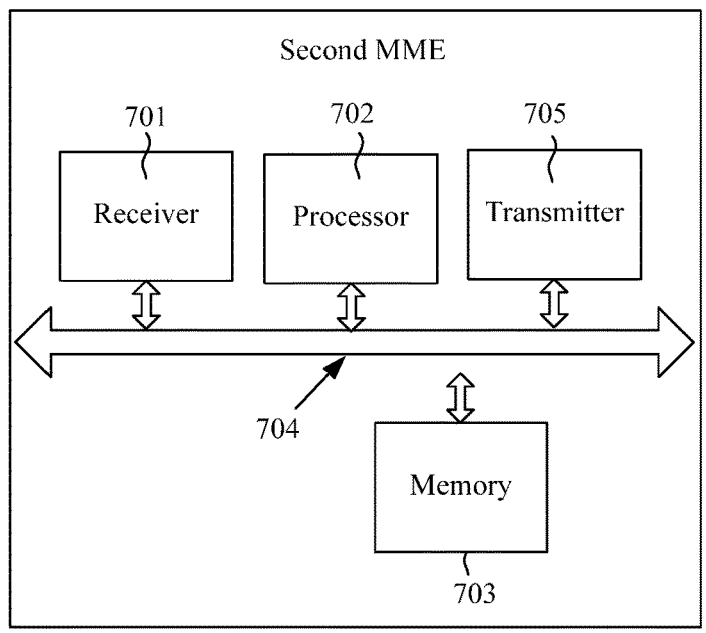
FIG. 7a is a schematic structural composition diagram of another second MME according to an embodiment of the present invention.

Optionally, as shown in FIG. 7a, the second MME further includes:

a transmitter 705, configured to send an interaction message to the UE by using the first MME when the processor 702 executes the access request procedure of the UE according to the access request message, where the receiver 701 is specifically configured to: when the processor 702 executes the access request procedure of the UE according to the access request message, receive, by using the first MME, an interaction message sent by the UE.

Optionally, the receiver 701 is further configured to receive mobility management context information of the UE forwarded by the first MME; and the processor 702 is specifically configured to execute the access request procedure of the UE according to the access request message and the mobility management context information of the UE.

Optionally, the transmitter 705 is further configured to send a mobility management context request message to an original MME of the UE according to the identity of the UE carried in the access request message;

the receiver 701 is further configured to receive a mobility management context response message sent by the original MME of the UE, where the mobility management context response message carries mobility management context information of the UE; and the processor 702 is specifically configured to execute the access request procedure of the UE according to the access request message and the mobility management context information of the UE.

This embodiment of the present invention provides a second MME. Based on the foregoing technical solution, the second MME may execute an access request procedure of UE according to an access request message of the UE forwarded by a first MME, so that the UE can use a correct MME in time to execute the access request procedure.

Figure 8:
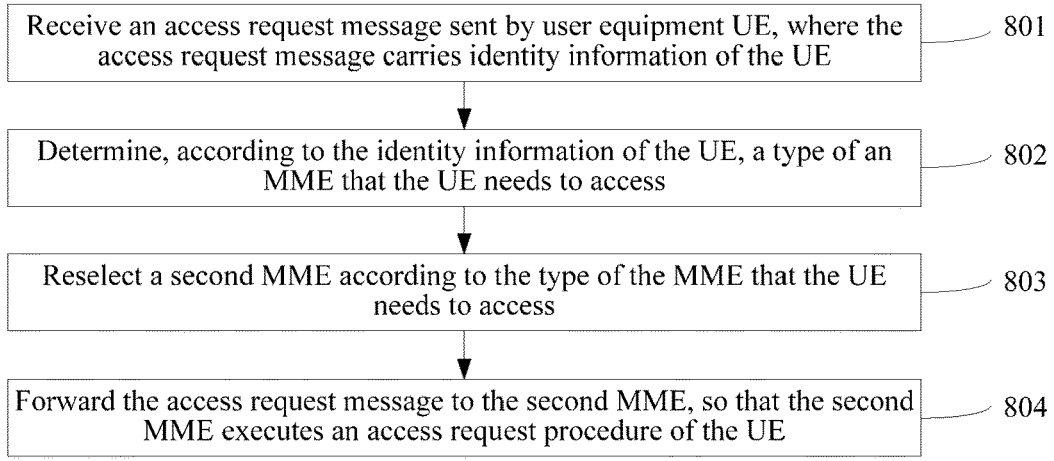
FIG. 8 is a schematic flowchart 1 of an MME reselection method according to an embodiment of the present invention.

Based on the first MME provided in the foregoing embodiment, an embodiment of the present invention provides an MME reselection method. The method is executed by the first MME. As shown in FIG. 8, the method includes:

801: Receive an access request message sent by UE, where the access request message carries identity information of the UE.

The UE selects, according to a system broadcast message of an eNodeB, an appropriate cell to camp on, and initiates an access request procedure to the eNodeB. The eNodeB selects, according to a network topology, an MME to serve the UE, and forwards the access request message of the UE to the MME for processing. The MME selected by the eNodeB according to the network topology is the first MME.

The access request message may be an attach request or a routing area update request.

If a type of the access request message is an attach request message, the identity information of the UE is an international mobile subscriber identity (IMSI for short) of the UE.

The attach request message further includes: a core network capability of the UE, a discontinuous reception parameter specified by the UE, an encryption option transmission mark, an attach type, a NAS sequence number, NAS-media access control, and the like.

If the access request message is a routing area update request message, the identity information of the UE is an IMSI of the UE; or the identity information of the UE may be further a globally unique temporary identity (GUTI for short) that is allocated, to the UE, by an MME that executes a previous attach procedure of the UE or an MME that is in a previous routing area update procedure before the current routing area update request.

The routing area update request message further includes an attach type and other information.

802: Determine, according to the identity information of the UE, a type of an MME that the UE needs to access.

Optionally, the first MME may determine, according to the identity information of the UE and preconfiguration indication information, the type of the MME that the UE needs to access, where the preconfiguration indication information includes information about a correspondence between the identity information of the UE and the type of the MME that the UE needs to access.

The preconfiguration indication information is stored in the MME, and includes information about the correspondence between identity (ID for short) information of the UE and the type of the MME that the UE needs to access.

Specifically, the identity information of the UE included in the preconfiguration indication information is specifically information about an ID of the UE.

Further, the first MME may search, according to the IMSI of the UE, for the ID of the corresponding UE and the information about the type of the MME that the UE needs to access, and determine the type of the MME that the UE needs to access.

Optionally, the first MME may further obtain subscription data of the UE from a home subscriber server HSS according to the identity information of the UE, where the subscription data includes information about the type of the MME that the UE needs to access.

The subscription data is stored in the HSS, and includes information about a correspondence between an ID of the UE and the type of the MME that the UE needs to access.

Specifically, the identity information of the UE included in the subscription data of the UE is specifically information about the ID of the UE.

Further, the first MME may request and obtain, from the HSS according to the IMSI of the UE, the ID of the corresponding UE and the information about the type of the MME that the UE needs to access in the subscription data, and determine the type of the MME that the UE needs to access.

Optionally, if the UE initiates a routing area update request, the first MME may further obtain, according to the identity information of the UE, a mobility management context of the UE from an original MME accessed by the UE, where the mobility management context includes the information about the type of the MME that the UE needs to access.

The mobility management context is stored in the original MME, and includes a GUTI allocated to the UE by an MME that executes a previous attach procedure of the UE or an MME that is in a previous routing area update procedure before the current routing area update request, an indication of the type of the MME that the UE needs to access, a TAI that is effectively accessed by the UE last time, a core network capability of the UE, a discontinuous reception parameter specified by the UE, a type of a packet data network, security encryption information (for example, an encryption and decryption manner for interaction with the UE), an attach type, a NAS sequence number, NAS-media access control, and the like.

Specifically, the identity information of the UE included in the mobility management context is specifically the GUTI of the UE.

Further, the first MME learns, according to the GUTI of the UE, an identifier of the original MME storing the mobility management context of the UE, and requests the original MME to forward mobility management context information of the UE, and the first MME determines, according to the indication, which is included in the mobility management context information, of the type of the MME that the UE needs to access, the type of the MME that the UE needs to access.

It should be noted that because an operator usually distinguishes service types of UEs according to number segments or package types of the UEs, types of MMEs may be classified according to the number segments of the UEs, or may be classified according to the package types of the UEs, or may be classified according to an actual requirement of the operator. How to classify the types of the MMEs is not specifically limited in the present invention.

803: Reselect a second MME according to the type of the MME that the UE needs to access.

Specifically, if the type of the MME that the UE needs to access is inconsistent with a type of the first MME, the first MME may reselect a second MME according to the type of the MME that the UE needs to access; an address of a type of the second MME is obtained according to preconfigured information about types of all MMEs on a network or is obtained from a DNS server, and the first MME establishes a connection relationship with the second MME according to the address, implementing reselection of an MME for the UE.

It should be noted that if the type of the MME that needs to be accessed includes multiple MMEs that can be used, a connection is established to a closest MME that is selected according to a network topology.

804: Forward the access request message to the second MME, so that the second MME executes an access request procedure of the UE.

Specifically, the first MME forwards the already received access request message of the UE to the second MME, so that the second MME may execute the access request procedure of the UE.

It should be noted that, persons skilled in the art may understand that, if the type of the MME that the UE needs to access is consistent with the type of the first MME, an MME does not need to be reselected, and the first MME directly executes and completes the access request procedure of the UE. This case is not in the scope of the description of the present invention.

This embodiment of the present invention provides an MME reselection method. Based on the foregoing technical solution, a first MME may reselect, for UE, an MME that the UE needs to access, that is, a second MME, and forward an access request message of the UE to the second MME, so that the UE can use a correct MME in time to execute an access request procedure. Meanwhile, because the first MME may select, for the UE, an MME matching a type of a service of the UE, which is equivalent to enabling UE that subscribes to a different service to access an MME corresponding to the type of the service of the UE, so that an operator may use MMEs to classify UEs that are managed, thereby improving management efficiency of the operator.

Further, an MME in the prior art can execute the access request procedure according to only an access request message of the UE forwarded by an eNodeB, while the first MME in this solution may further help the UE to select an MME that the UE needs to access and forward an access request of the UE. Therefore, during implementation of this solution, only software of an existing MME needs to be updated, to achieve an objective that the MME can help the UE to perform reselection and forward an access request to an MME that needs to be accessed. In addition, because a quantity of MMEs is relatively small, impact on an operator network is also relatively small.

Figure 9:
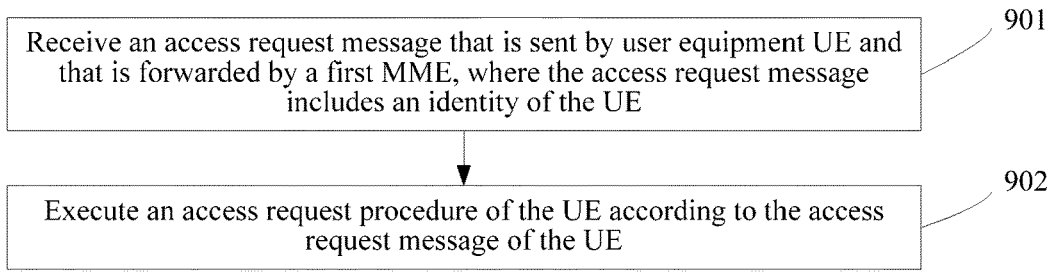
FIG. 9 is a schematic flowchart 2 of an MME reselection method according to an embodiment of the present invention.

Based on the second MME provided in the foregoing embodiment, an embodiment of the present invention provides another MME reselection method. The method is executed by the second MME. The second MME is an MME that is reselected by the first MME for UE according to a type of an MME that the UE needs to access. As shown in FIG. 9, the method includes:

901: Receive an access request message that is sent by user equipment UE and that is forwarded by a first MME, where the access request message includes an identity of the UE.

The first MME is an MME that is selected by an eNodeB for the UE according to a network topology.

Specifically, the second MME receives the access request message that is sent by the UE and that is forwarded by the first MME.

For a detailed description of the access request message, refer to the description of 801, and details are not described herein in this embodiment again.

902: Execute an access request procedure of the UE according to the access request message.

Optionally, when the access request procedure of the UE is executed according to the access request message, the second MME may send an interaction message to the UE by using the first MME, and receive, by using the first MME, the interaction message sent by the UE.

It should be noted that, persons skilled in the art may understand that, when executing the access request procedure of the UE, the second MME may send the interaction message to the UE by using the first MME, and receive, by using the first MME, the interaction message sent by the UE; or as shown in FIG. 2 and FIG. 3 in the prior art, the second MME may directly send the interaction message to the UE by using the eNodeB, and receive, by using the eNodeB, the interaction message sent by the UE, as shown in steps 205 to 216 and steps 306 to 315; or any other device or manner that may help the second MME to forward the interaction message to the UE is used, which is not specifically limited in the present invention. For ease of description of the present invention, the foregoing embodiment is described by using only an example in which the second MME sends the interaction message to the UE by using the first MME and the first MME receives, by using the first MME, the interaction message sent by the UE.

This embodiment of the present invention provides an MME reselection method. Based on the foregoing technical solution, a second MME may execute an access request procedure of UE according to an access request message of the UE forwarded by a first MME, so that the UE can use a correct MME in time to execute the access request procedure. Meanwhile, an MME in the prior art can execute the access request procedure according to only an access request message of the UE forwarded by an eNodeB, and the second MME in this solution may further execute the access request procedure of the UE according to the access request message forwarded by the first MME. Therefore, during implementation of this solution, only software of an existing MME needs to be updated, to achieve an objective that the MME may execute the access request procedure of the UE according to the access request message forwarded by the first MME. In addition, because a quantity of MMEs is relatively small, impact on an operator network is also relatively small.

Figure 10:
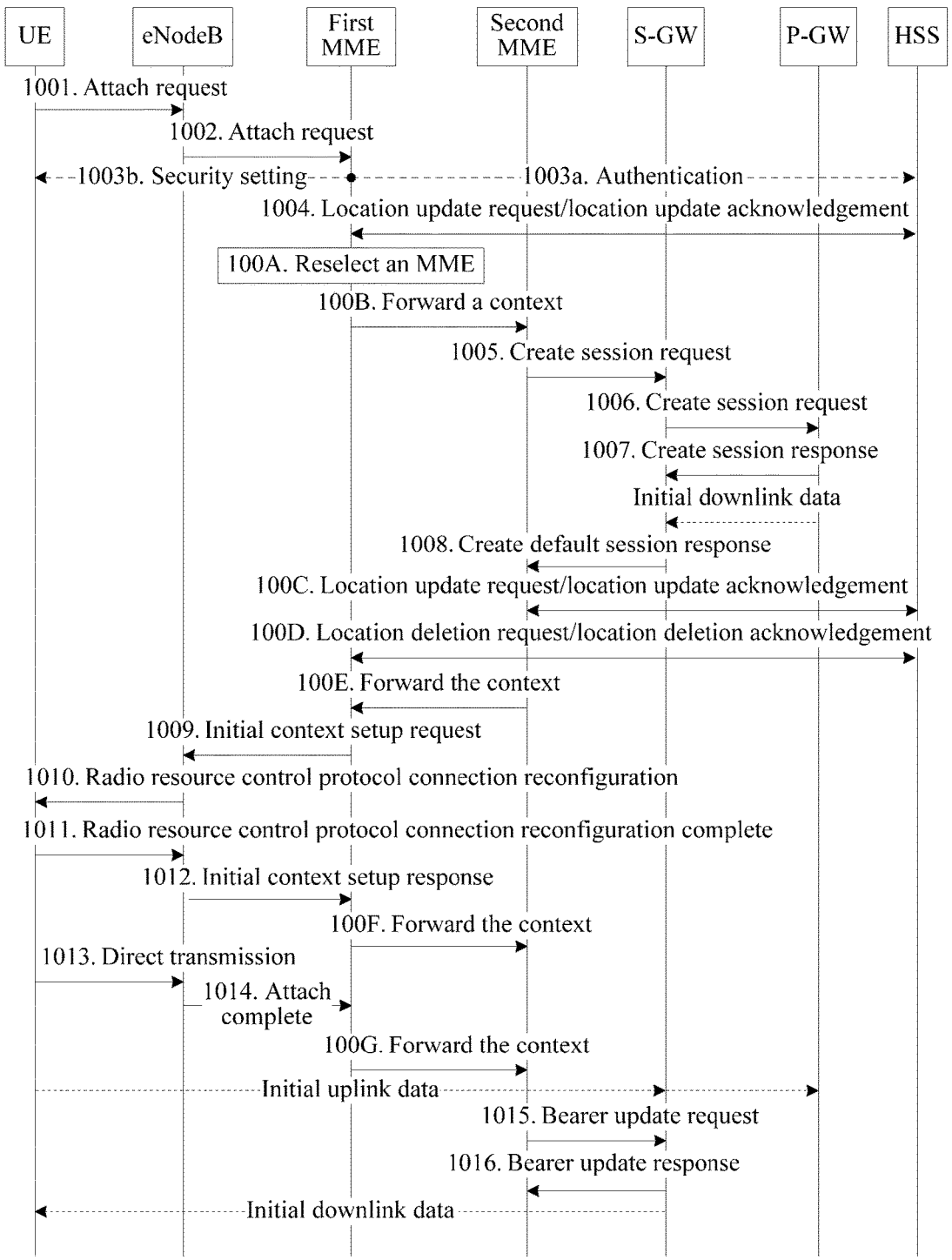
FIG. 10 is a schematic interaction diagram 1 of executing an attach procedure in an MME reselection method according to an embodiment of the present invention.

An example in which UE executes an attach procedure is used below to describe in detail an MME reselection method provided in the present invention, and a specific implementation process is shown in FIG. 10.

It should be noted that an interaction process of the attach procedure discussed in this embodiment is the same as some steps of an existing attach procedure, the same steps are not described one by one, and only an interaction process of MME reselection provided in this embodiment of the present invention is emphasized and described.

1001: UE sends an attach request message to an eNodeB.

1002: The eNodeB forwards, to a first MME, the attach request message sent by the UE.

1003a: The first MME and an HSS authenticate the UE.

1003b: The first MME and the UE perform security setting on a NAS message.

1004: The first MME exchanges a location update request message and acknowledges a location update request acknowledgement message with the HSS.

100A: Reselect an MME for the UE according to a type of an MME that the UE needs to access.

Specifically, the first MME determines, according to identity information of the UE, the type of the mobility management entity MME that the UE needs to access, reselects the MME, that is, a second MME, and establishes a connection to the second MME. For a specific process, refer to the descriptions of 802 and 803.

It should be noted that, if the UE does not need to reselect the MME, the first MME directly executes and completes a subsequent attach procedure of the UE, and it is unnecessary to use the second MME to execute the attach procedure. This case is not in the scope of the description of the present invention.

100B: The first MME forwards a context to a second MME.

The context includes the attach request message sent by the UE.

1005: The second MME sends a create session request message to an S-GW.

1006: The S-GW connects to and sends the create session request message to a P-GW.

1007: The P-GW returns a create session response message to the S-GW.

1008: The S-GW returns the create session response message to the second MME.

100C: The second MME exchanges a location update request message and a location update request acknowledgement message with the HSS.

Specifically, the second MME sends the location update request message to the HSS, and the HSS updates stored information about a location of an MME on which the UE is located, where the HSS updates information about a location at which the UE is served by the first MME to information about a location at which the UE is served by the second MME. After updating the information about the location of the MME on which the UE is located, the HSS returns the location update request acknowledgement message to the second MME.

100D: The HSS exchanges a location deletion request message and a location deletion request acknowledgement message with the first MME.

Specifically, the HSS initiates the location deletion request message to the first MME; the first MME deletes the stored location information of the UE, that is, a mobility context established between the first MME and the UE, and returns the location deletion request acknowledgement message to the HSS after the deletion.

100E: The second MME sends a context to the first MME.

The context includes an attach accept message and an initial context setup request message.

1009: The first MME sends an initial context setup request message the eNodeB.

1010: The eNodeB sends a radio resource control protocol connection reconfiguration message to the UE.

1011: The UE sends a radio resource control protocol connection reconfiguration complete message to the eNodeB.

1012: The eNodeB sends an initial context setup response message the first MME.

100F: The first MME forwards the context to the second MME.

The context includes an initial context setup response, and the initial context setup response message includes a TEID allocated by the eNodeB to a user plane, a user plane address of the eNodeB, and the like.

1013: The UE sends a direct transmission message to the eNodeB.

1014: The eNodeB forwards an attach complete message to the first MME.

100G: The first MME forwards a context to the second MME.

The context includes the attach complete message.

1015: The second MME sends a bearer update request message to the S-GW.

1016: The S-GW sends a bearer update response message to the second MME, and starts to send, to the eNodeB, a downlink data packet that is buffered starting from 1007.

Based on the foregoing embodiment, a first MME may reselect, for UE, an MME that the UE needs to access, that is, a second MME, and forward an access request message of the UE to the second MME, and the second MME may execute an access request procedure of the UE according to the access request message of the UE forwarded by the first MME, so that the UE can use a correct MME in time to execute the access request procedure.

Figure 11:
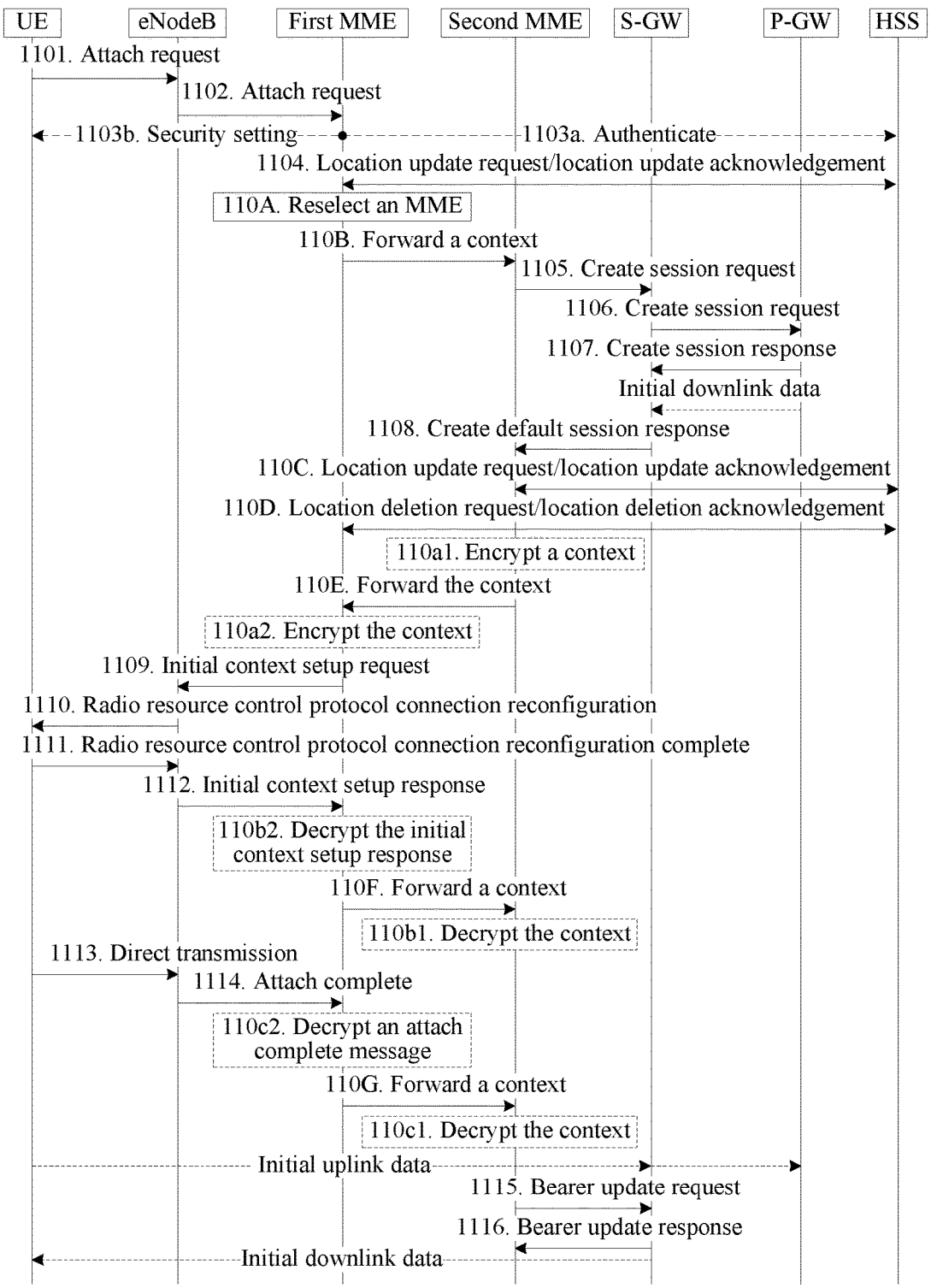
FIG. 11 is a schematic interaction diagram 2 of executing an attach procedure in an MME reselection method according to an embodiment of the present invention.

An example in which UE executes an attach procedure is used below to describe in detail an MME reselection method provided in the present invention, and a specific implementation process is shown in FIG. 11.

It should be noted that an interaction process of the attach procedure discussed in this embodiment is the same as some steps of the attach procedure of the MME reselection provided in the previous embodiment, the same steps are not described one by one again, and only an encryption process when an MME interacts with UE is emphasized and described.

It should be further noted that, all steps indicated by using dashed boxes in FIG. 11 represent optional steps.

1101: UE sends an attach request message to an eNodeB.

1102: The eNodeB forwards, to a first MME, the attach request message sent by the UE.

1103a: The first MME and an HSS authenticate the UE.

1103b: The first MME and the UE perform security setting on a NAS message.

1104: The first MME exchanges a location update request message and a location update request acknowledgement message with the HSS.

110A: Reselect an MME for the UE according to a type of an MME that the UE needs to access.

110B: The first MME forwards a context to a second MME.

The context includes the attach request message sent by the UE.

Optionally, the context may further include a security context (that is, an encryption manner agreed between the MME and the UE, key information, and the like) established by the first MME and the UE.

1105: The second MME sends a create session request message to an S-GW.

1106: The S-GW connects to and sends the create session request message to a P-GW.

1107: The P-GW returns a create session response message to the S-GW.

1108: The S-GW returns the create session response message to the second MME.

110C: The second MME exchanges a location update request message and a location update request acknowledgement message with the HSS.

110D: The HSS exchanges a location deletion request message and a location deletion request acknowledgement message with the first MME.

110a1: The second MME encrypts a context.

The context is a context that is to be sent by the second MME to the first MME, and includes an attach accept message and an initial context setup request message.

Specifically, whether this step exists depends on 110B.

If the context in 110B includes the security context established by the first MME and the UE, in this step, the second MME needs to encrypt the context in the encryption manner in the security context that is established by the first MME and the UE and that is forwarded by the first MME in 110B.

If the context in 110B does not include the security context established by the first MME and the UE, this step is omitted, and the second MME does not need to perform an encryption operation.

110E: The second MME sends the context to the first MME.

The context includes an attach accept message and an initial context setup request message.

110a2: The first MME encrypts the context.

The context is a context sent by the second MME, and includes the attach accept message and the initial context setup request message.

Specifically, whether this step exists depends on 110B.

If the context in 110B includes the security context established by the first MME and the UE, this step is omitted, and the first MME does not need to perform an encryption operation.

If the context in 110B does not include the security context established by the first MME and the UE, because the first MME does not forward the security context established by the first MME and the UE to the second MME, the second MME cannot learn an encryption and decryption manner for interaction with the UE, and the first MME needs to encrypt the context sent by the second MME.

1109: The first MME sends an initial context setup request message the eNodeB.

1110: The eNodeB sends a radio resource control protocol connection reconfiguration message to the UE.

1111: The UE sends a radio resource control protocol connection reconfiguration complete message to the eNodeB.

1112: The eNodeB sends an initial context setup response message the first MME.

110b2: The first MME decrypts the initial context setup response message.

The initial context setup response message is sent by the eNodeB.

Specifically, whether this step exists depends on 110B.

If the context in 110B includes the security context established by the first MME and the UE, this step is omitted, and the first MME does not need to perform a decryption operation.

If the context in 110B does not include the security context established by the first MME and the UE, because the first MME does not forward the security context established by the first MME and the UE to the second MME, the second MME cannot learn an encryption and decryption manner for interaction with the UE, and the first MME needs to decrypt the initial context setup response message that is to be sent to the second MME.

110F: The first MME forwards a context to the second MME.

The context includes the initial context setup response message.

110b1: The second MME decrypts the context.

The context is a context sent by the first MME, and includes the initial context setup response message.

Specifically, whether this step exists depends on 110B.

If the context in 110B includes the security context established by the first MME and the UE, in this step, the second MME needs to decrypt, in the decryption manner in the security context that is established by the first MME and the UE and that is forwarded by the first MME in 110B, the initial context setup response message forwarded by the first MME.

If the context in 110B does not include the security context established by the first MME and the UE, this step is omitted, and the second MME does not need to perform a decryption operation.

1113: The UE sends a direct transmission message to the eNodeB.

1114: The eNodeB forwards an attach complete message to the first MME.

110c2: The first MME decrypts the attach complete message.

The attach complete message is sent by the eNodeB.

Specifically, whether this step exists depends on 110B.

If the context in 110B includes the security context established by the first MME and the UE, this step is omitted, and the first MME does not need to perform a decryption operation.

If the context in 110B does not include the security context established by the first MME and the UE, because the first MME does not forward the security context established by the first MME and the UE to the second MME, the second MME cannot learn an encryption and decryption manner for interaction with the UE, and the first MME needs to decrypt the attach complete message that is to be sent to the second MME.

110G: The first MME forwards a context to the second MME.

The context includes the attach complete message.

110c1: The second MME decrypts the context.

The context is a context sent by the first MME, and includes the attach complete message.

Specifically, whether this step exists depends on 110B.

If the context in 110B includes the security context established by the first MME and the UE, in this step, the second MME needs to decrypt, in the decryption manner in the security context that is established by the first MME and the UE and that is forwarded by the first MME in 110B, the attach complete message forwarded by the first MME.

If the context in 110B does not include the security context established by the first MME and the UE, this step is omitted, and the second MME does not need to perform a decryption operation.

1115: The second MME sends a bearer update request message to the S-GW.

1116: The S-GW sends a bearer update response message to the second MME, and starts to send, to the eNodeB, a downlink data packet that is buffered starting from 1107.

Based on the foregoing embodiment, a first MME may reselect, for UE, an MME that the UE needs to access, that is, a second MME, and forward an access request message of the UE to the second MME, and the second MME may execute an access request procedure of the UE according to the access request message of the UE forwarded by the first MME, so that the UE can use a correct MME in time to execute the access request procedure.

Figure 12:
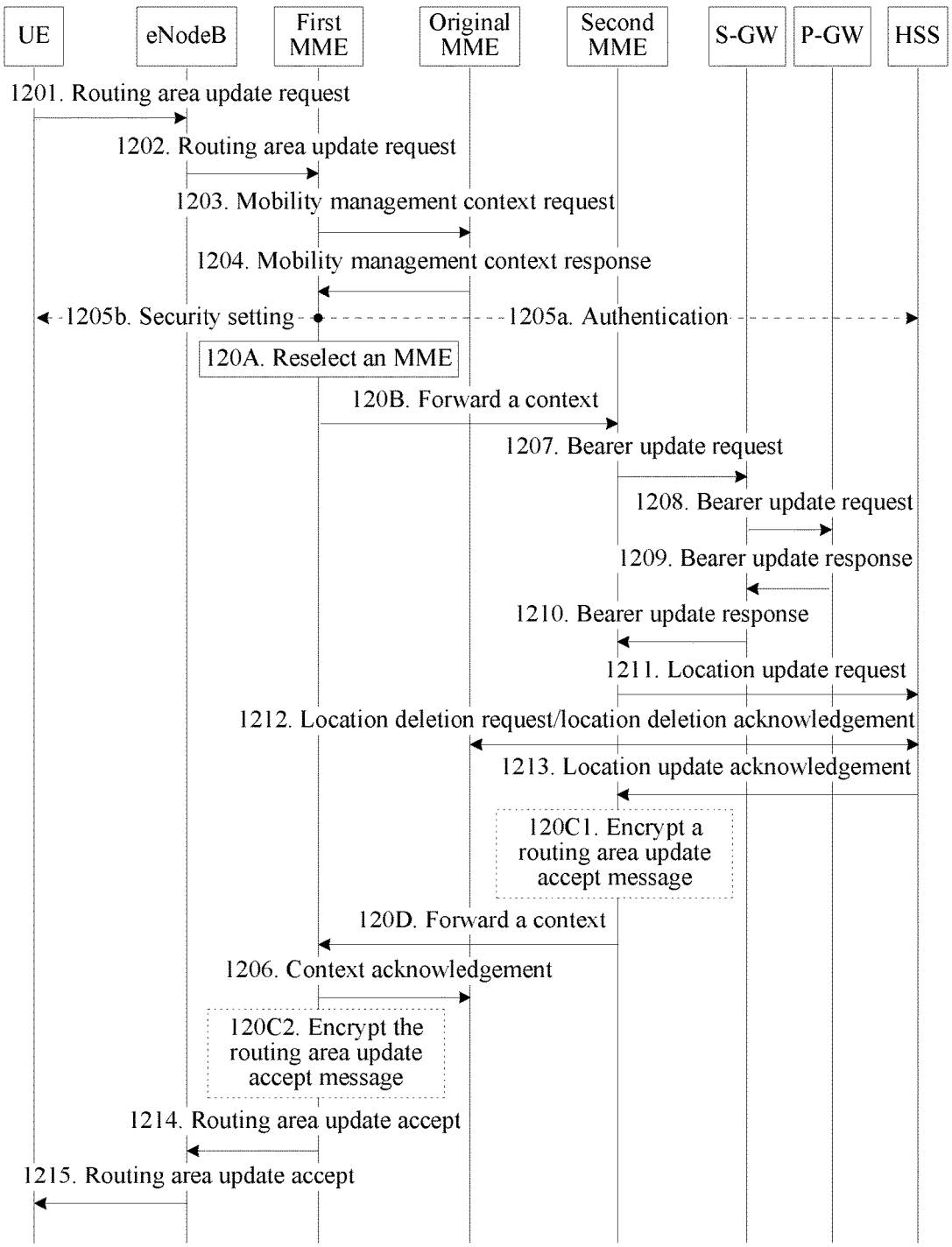
FIG. 12 is a schematic interaction diagram 1 of executing a routing area update procedure in an MME reselection method according to an embodiment of the present invention.

An example in which UE executes a routing area update procedure is used below to describe in detail an MME reselection method provided in the present invention, and a specific implementation process is shown in FIG. 12.

It should be noted that an interaction process of the routing area update procedure discussed in this embodiment is the same as some steps of an existing routing area update procedure, the same steps are not described one by one, and only an interaction process of MME reselection provided in this embodiment of the present invention is emphasized and described.

It should be further noted that, all steps indicated by using dashed boxes in FIG. 12 represent optional steps.

1201: UE sends a routing area update request message to an eNodeB.

1202: The eNodeB forwards the routing area update request message to a first MME.

1203: The first MME sends a mobility management context request message to an original MME.

1204: The original MME returns a mobility management context response message to the first MME.

1205a: The first MME and an HSS authenticate the UE.

1205b: The first MME and the UE perform security setting on a NAS message.

It should be noted that whether this step exists depends on 1204.

If a mobility management context that is returned by the original MME to the first MME in 1204 includes a security context of the original MME and the UE, this step is omitted, and the first MME and the UE do not need to perform security setting on the NAS message.

If a mobility management context that is returned by the original MME to the first MME in 1204 does not include a security context of the original MME and the UE, the first MME and the UE need to perform security setting on the NAS message in this step.

120A: Reselect an MME for the UE according to a type of an MME that the UE needs to access.

Specifically, the first MME determines, according to identity information of the UE, the type of the mobility management entity MME that the UE needs to access, reselects the MME, that is, a second MME, and establishes a connection to the second MME. For a specific process, refer to the descriptions of 802 and 803.

It should be noted that, if the UE does not need to reselect the MME, the first MME directly executes and completes a subsequent routing area update procedure of the UE, and it is unnecessary to use the second MME to perform the routing area update procedure. This case is not in scope of the description of the present invention.

120B: The first MME forwards a context to the second MME.

The context includes the routing area update request message sent by the UE and a mobility management context, which is obtained by the first MME, of the UE.

Optionally, the context may further include a security context (that is, an encryption manner agreed between the first MME and the UE, key information, and the like) established by the first MME and the UE.

1207: The second MME initiates a bearer update request message to an S-GW.

1208: The S-GW sends the bearer update request message to a P-GW.

1209: The P-GW returns a bearer update response message to the S-GW.

1210: The S-GW sends the bearer update response message to the second MME.

1211: The second MME initiates a location update request message to an HSS.

1212: The HSS exchanges a location deletion request message and a location deletion request acknowledgement message with the original MME.

1213: The HSS returns a location update request acknowledgement message to the second MME.

120C1: The second MME encrypts a routing area update accept message.

The routing area update accept message includes a GUTI that is allocated by the second MME to the UE.

Specifically, whether this step exists depends on 120B.

If the context in 120B includes the security context established by the first MME and the UE, in this step, the second MME needs to encrypt the routing area update accept message in the encryption manner in the security context that is established by the first MME and the UE and that is forwarded by the first MME in 120B.

If the context in 120B does not include the security context established by the first MME and the UE, this step is omitted, and the second MME does not need to perform an encryption operation.

120D: The second MME sends a context to the first MME.

The context includes the routing area update accept message and an S-GW change indication.

1206: The first MME sends a context acknowledgement message to the original MME.

The context acknowledgement message includes the S-GW change indication.

It should be noted that, because selection of the S-GW in the routing area update procedure is performed by the second MME, the first MME can send the context acknowledgement to the original MME only after the second MME returns an S-GW change indication message. Therefore, 1206 is performed herein.

120C2: The first MME encrypts the routing area update accept message.

The routing area update accept message is included in the context sent by the second MME.

Specifically, whether this step exists depends on 120B.

If the context in 120B includes the security context established by the first MME and the UE, this step is omitted, and the first MME does not need to perform an encryption operation.

If the context in 120B does not include the security context established by the first MME and the UE, because the first MME does not forward the security context established by the first MME and the UE to the second MME, the second MME cannot learn an encryption and decryption manner for interaction with the UE, and the first MME needs to encrypt the routing area update accept message sent by the second MME.

1214: The first MME sends the routing area update accept message to the eNodeB.

The routing area update accept message includes the GUTI that is allocated by the second MME to the UE.

1215: The eNodeB forwards the routing area update accept message to the UE.

Based on the foregoing embodiment, a first MME may reselect, for UE, an MME that the UE needs to access, that is, a second MME, and forward an access request message of the UE to the second MME, and the second MME may execute an access request procedure of the UE according to the access request message of the UE forwarded by the first MME, so that the UE can use a correct MME in time to execute the access request procedure.

Figure 13:
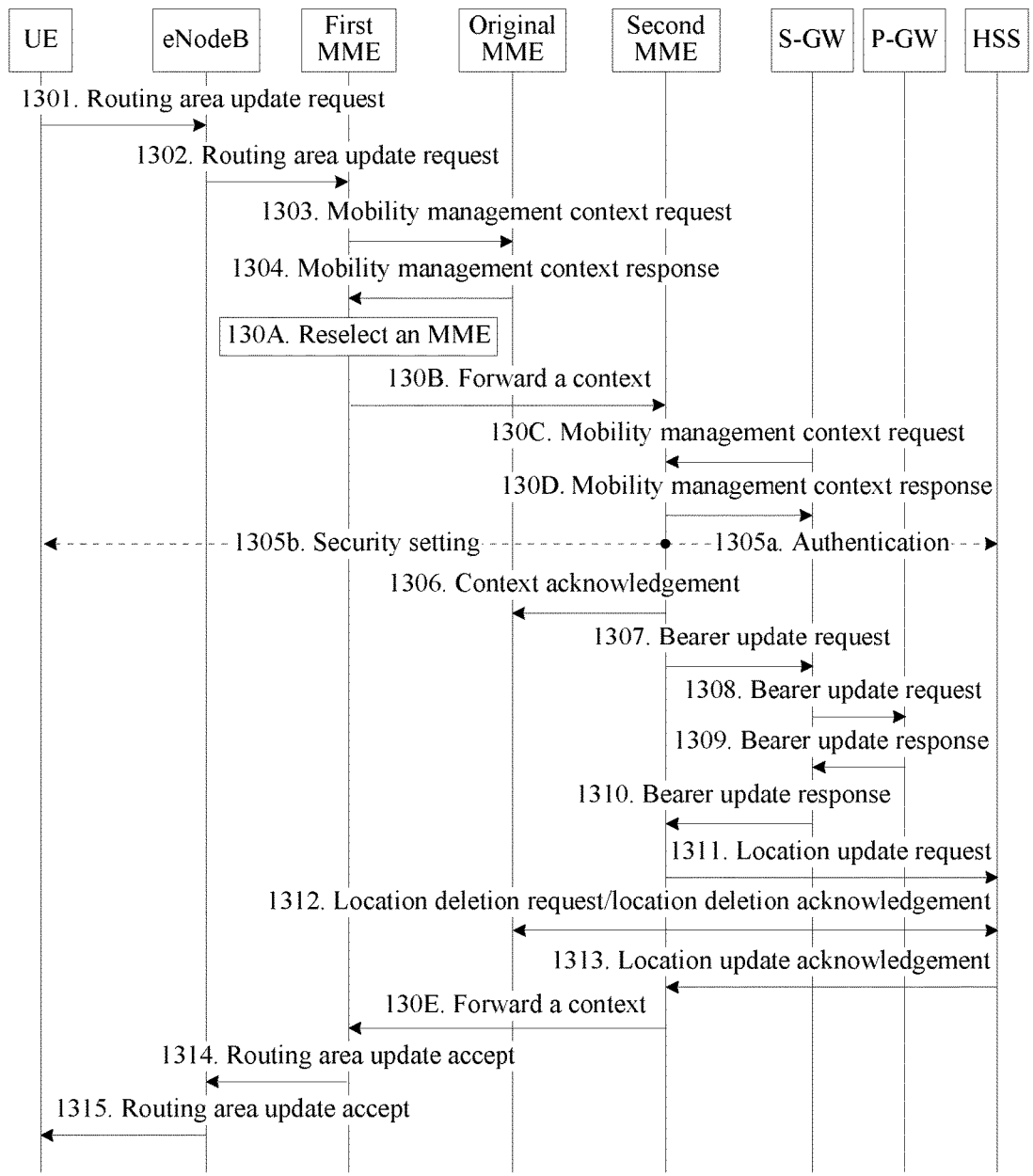
FIG. 13 is a schematic interaction diagram 2 of executing a routing area update procedure in an MME reselection method according to an embodiment of the present invention.

An example in which UE executes a routing area update procedure is used below to describe in detail an MME reselection method provided in the present invention, and a specific implementation process is shown in FIG. 13.

It should be noted that, an interaction process of the routing area update procedure discussed in this embodiment is the same as some steps of the routing area update procedure of MME reselection provided in the previous embodiment, and the same steps are not described one by one herein again. A difference lies in a channel by using which the second MME obtains a mobility management context of the UE. In the previous embodiment, the mobility management context of the UE that the second MME obtains is first obtained by the first MME from the original MME and then forwarded to the second MME. In this embodiment, the mobility management context of the UE obtained by the second MME is directly requested and obtained by the second MME from the original MME. Therefore, this embodiment emphasizes and describes only this process.

1301: UE sends a routing area update request message to an eNodeB.

1302: The eNodeB forwards the routing area update request message to a first MME.

1303: The first MME sends a mobility management context request message to an original MME.

1304: The original MME returns a mobility management context response message to the first MME.

130A: Reselect an MME for the UE according to a type of an MME that the UE needs to access.

Specifically, the first MME determines, according to identity information of the UE, the type of the mobility management entity MME that the UE needs to access, reselects the MME, that is, the second MME, and establishes a connection to the second MME. For a specific process, refer to the descriptions of 802 and 803.

It should be noted that, if the UE does not need to reselect the MME, the first MME directly executes and completes a subsequent routing area update procedure of the UE, and it is unnecessary to use the second MME to execute the routing area update procedure. This case is not in the scope of the description of the present invention.

130B: The first MME forwards a context to a second MME.

The context includes the routing area update request message sent by the UE.

130C: The second MME sends the mobility management context request message to the original MME.

Specifically, the second MME learns, according to information about a GUMMEI included in a GUTI, an address of the original MME at which a mobility management context of the UE is located, and sends the mobility management context request message to the original MME.

The mobility management context request message includes the GUTI of the UE.

130D: The original MME returns the mobility management context response message to the second MME.

Specifically, the original MME determines a mobility management context of the UE according to the GUTI, and returns the mobility management context of the UE to the second MME according to the mobility management context response message.

1305a: The second MME and an HSS authenticate the UE.

1305b: The second MME and the UE perform security setting on a NAS message.

Specifically, the second MME and the UE perform security setting, such as integrity protection, an encryption manner, or key information, on the NAS message.

It should be noted that whether this step exists depends on 130D.

If a mobility management context that is returned by the original MME to the second MME in 130D includes a security context of the original MME and the UE, this step is omitted, and the second MME and the UE do not need to perform security setting on the NAS message.

If a mobility management context that is returned by the original MME to the second MME in 130D does not include a security context of the original MME and the UE, the second MME and the UE need to perform security setting on the NAS message in this step.

1306: The second MME sends a context acknowledgement message to the original MME.

The context acknowledgement message includes an S-GW change indication.

1307: The second MME initiates a bearer update request message to an S-GW.

1308: The S-GW sends a bearer update request message to a P-GW.

1309: The P-GW returns a bearer update response message to the S-GW.

1310: The S-GW sends the bearer update response message to the second MME.

1311: The second MME initiates a location update request message to the HSS.

1312: The HSS exchanges a location deletion request message and a location deletion request acknowledgement message with the original MME.

1313: The HSS returns a location update request acknowledgement message to the second MME.

130E: The second MME sends a context to the first MME.

The context includes a routing area update accept message, and the routing area update accept message includes the GUTI that is allocated by the second MME to the UE.

1314: The MME sends the routing area update accept message to the eNodeB.

The routing area update accept message includes the GUTI that is allocated by the second MME to the UE.

1315: The eNodeB forwards the routing area update accept message to the UE.

Based on the foregoing embodiment, a first MME may reselect, for UE, an MME that the UE needs to access, that is, a second MME, and forward an access request message of the UE to the second MME, and the second MME may execute an access request procedure of the UE according to the access request message of the UE forwarded by the first MME, so that the UE can use a correct MME in time to execute the access request procedure.

In the several embodiments provided in the present application, it should be understood that the disclosed MME and method may be implemented in other manners. For example, the described MME embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A first mobility management apparatus, comprising:
   a receiver, configured to receive an access request message sent from user equipment (UE), wherein the access request message carries identity information of the UE;
   a processor, configured to:
      obtain subscription data of the UE from a subscriber server according to the identity information of the UE, wherein the subscription data comprises information about a type of mobility management apparatus that the UE may access;
      determine, according to the information about the type of the mobility management apparatus that the UE may access, the type of the mobility management apparatus that the UE may access; and
      reselect a second mobility management apparatus according to the type of the mobility management apparatus that the UE may access; and
   a transmitter, configured to forward the access request message to the second mobility management apparatus, wherein the access request message is for requesting the second mobility management apparatus to execute an access request procedure of the UE.

2. A method of reselecting a mobility management apparatus, comprising:
   receiving an access request message sent from user equipment (UE), wherein the access request message carries identity information of the UE;
   obtaining subscription data of the UE from a subscriber server according to the identity information of the UE, wherein the subscription data comprises information about a type of mobility management apparatus that the UE may access;
   determining, according to the information about the type of the mobility management apparatus that the UE may access, the type of the mobility management apparatus that the UE may access;
   reselecting a second mobility management apparatus according to the type of the mobility management apparatus that the UE may access; and
   forwarding the access request message to the second mobility management apparatus, wherein the access request message is for requesting the second mobility management apparatus to execute an access request procedure of the UE.

3. A non-transitory computer-readable storage medium storing a program to be executed by at least one processor, the program including instructions to configure the at least one processor for:
   receiving an access request message sent from user equipment (UE), wherein the access request message carries identity information of the UE;
   obtaining subscription data of the UE from a subscriber server according to the identity information of the UE, wherein the subscription data comprises information about a type of mobility management apparatus that the UE may access;
   determining, according to the information about the type of the mobility management apparatus that the UE may access, the type of the mobility management apparatus that the UE may access;
   reselecting a second mobility management apparatus according to the type of the mobility management apparatus that the UE may access; and
   forwarding the access request message to the second mobility management apparatus, wherein the access request message is for requesting the second mobility management apparatus to execute an access request procedure of the UE.

* * * * *